US010248536B2

(12) United States Patent
Abadi et al.

(10) Patent No.: US 10,248,536 B2
(45) Date of Patent: Apr. 2, 2019

(54) METHOD FOR STATIC AND DYNAMIC CONFIGURATION VERIFICATION

(71) Applicant: International Business Machines Corporation, Armink, NY (US)

(72) Inventors: Aharon Abadi, Petach Tikva (IL); Nili Ifergan-Guy, Haifa (IL); Dmitri Pikus, Haifa (IL); Oleg Sternberg, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/338,485

(22) Filed: Oct. 31, 2016

(65) Prior Publication Data
US 2018/0121315 A1 May 3, 2018

(51) Int. Cl.
G06F 11/36 (2006.01)
G06F 8/71 (2018.01)
G06F 8/75 (2018.01)

(52) U.S. Cl.
CPC ......... *G06F 11/3604* (2013.01); *G06F 8/71* (2013.01); *G06F 8/75* (2013.01)

(58) Field of Classification Search
None
See application file for complete search history.

(56) References Cited

U.S. PATENT DOCUMENTS

| 8,655,307 B1* | 2/2014 | Walker | H04W 52/0212 455/405 |
| 9,158,522 B2* | 10/2015 | Nyisztor | H04L 41/082 |
| 9,203,698 B2* | 12/2015 | Burks | G06F 9/44505 |
| 2009/0222697 A1* | 9/2009 | Thakkar | G06F 11/3676 714/38.1 |
| 2010/0023926 A1* | 1/2010 | Sugawara | G06F 8/458 717/120 |
| 2013/0080890 A1* | 3/2013 | Krishnamurthi | H04W 4/20 715/702 |

(Continued)

OTHER PUBLICATIONS

Matsuura, "Practical Behavioral Inconsistency Detection between Source Code and Specification using Model Checking", IEEE Year: (2014).*

(Continued)

*Primary Examiner* — Hossain M Morshed
(74) *Attorney, Agent, or Firm* — G. E Eherlich

(57) ABSTRACT

According to an aspect of some embodiments of the present invention there is provided a method for verifying correctness of application configuration of an application, comprising: for each of baseline and changed source codes of an application analyzing a graph representation of an execution flow of a plurality of application functionalities performed by execution of the respective source code to identify a plurality of functional dependencies between source code segments of the baseline source code and a plurality of functional dependencies between source code segments of the changed source code, wherein each of the functional dependencies is at least one of data dependency and control dependency, identifying a configuration discrepancy according to a match between functional dependencies of the changed source code when compared to the baseline source code, and producing a notification when the configuration discrepancy is found and is not permitted by the configuration.

16 Claims, 9 Drawing Sheets

(56) References Cited

U.S. PATENT DOCUMENTS

| | | | | |
|---|---|---|---|---|
| 2013/0086434 | A1* | 4/2013 | Bhamidipaty | G06F 11/302 714/48 |
| 2015/0106596 | A1* | 4/2015 | Vorbach | G06F 9/3001 712/221 |
| 2015/0113117 | A1* | 4/2015 | Jun | H04L 43/0876 709/224 |
| 2015/0237027 | A1* | 8/2015 | Kim | H04L 63/08 726/3 |
| 2016/0077824 | A1* | 3/2016 | Vishnepolsky | G06F 8/65 717/172 |
| 2017/0185475 | A1* | 6/2017 | Dey | G06F 11/0793 |
| 2018/0121315 | A1* | 5/2018 | Abadi | G06F 11/3604 |
| 2018/0129581 | A1* | 5/2018 | Abadi | G06F 8/71 |

OTHER PUBLICATIONS

Mao Zheng et al., "Adaptive Mobile Applications to Dynamic Context", Journal of Computer and Communications, 2014, p. 2, pp. 9-13, Published Online Jul. 2014 in SciRes.

* cited by examiner

METHOD FOR STATIC AND DYNAMIC CONFIGURATION VERIFICATION

FIELD AND BACKGROUND OF THE INVENTION

The present invention, in some embodiments thereof, relates to a method and system for verifying application configuration of an application and, more particularly, but not exclusively, for identifying broken dependencies between source code segments of an application.

It is well known in the art that mobile applications client side has static design that amongst others contains screen layout, data model and logic. Any change in this static design has to be decided during the development time. There is an emerging demand in mobile applications to change the behavior of the applications, their functionality and appearance in a dynamic manner. This demand emerges from the dynamic environment, in which the mobile application is being deployed, the differences in users' behavior, needs and characteristics and other parameters that require different configurations of the mobile application.

The increasing number of mobile applications with dynamic application requirements raises the need to allow the application to be adapted to specific dynamic requirement after it has been released from the design environment.

An exemplary application that demonstrates the need for dynamic configuration of a mobile application is a shopping application. In such application, there might be a requirement to change the color of a price tag temporarily during specific sale or deal period. Another example of a requirement for dynamic design of a shopping mobile application might be the requirement to offer special offers and lower prices to premium customers.

Another exemplary application that demonstrates the need for dynamic configuration of a mobile application is an enterprise application. In such application, the layout and content of the application may need to be changed according to an employee's role.

In another exemplary application, a banking application may need to have the ability to adapt its configuration according to a user's identity. Additionally, the network type the user is using could define the content presented to him.

Yet another example is a military enterprise application. In such environment, some secret modules are not supposed to be exposed to a client at any time during the application's lifecycle. However, for selective configuration, these modules may need to be loaded at runtime, and be executed in a secured container.

SUMMARY OF THE INVENTION

According to an aspect of some embodiments of the present invention there is provided a method for verifying correctness of application configuration of an application, comprising: for each of baseline and changed source codes of an application analyzing a graph representation of an execution flow of a plurality of application functionalities performed by execution of a respective the source code to identify a plurality of functional dependencies between source code segments of the baseline source code and a plurality of functional dependencies between source code segments of the changed source code, wherein each of the plurality of functional dependencies is at least one of data dependency and control dependency, identifying a configuration discrepancy according to a match between plurality of functional dependencies of the changed source code when compared to the baseline source code, and producing a notification when the configuration discrepancy is found and the configuration discrepancy is not permitted by the configuration.

Optionally, the analyzing further defines, based on the identified plurality of functional dependencies, for each of the baseline and the changed source codes at least one dependency pair, each of the at least one dependency pair comprises two source code segments of a respective the source code, wherein one of the two source code segments functionally depends on another one of the two source code segments, and wherein the match is when the at least one dependency pair of the changed source code has a corresponding dependency pair in the baseline source code.

Optionally, the method further comprising: receiving the baseline source code and the changed source code, and generating each of the graph representations.

Optionally, the plurality of application functionalities includes at least one member of a group consisting of application logics, user interface (UI), screens and screen controls.

Optionally, at least one of the graph representations includes at least one member of a group consisting of a control flow graph and a data flow graph.

More optionally, at least one of the graph representations includes at least one state machine.

Optionally, at least one of the graph representations includes at least one member of a group consisting of symbolic representation and an abstract syntax tree.

Optionally, the application is a mobile application.

Optionally, the changed source code includes at least one source code segment not included in the baseline source code.

Optionally, the method further comprising: identifying, for each of at least one dependency pair of the changed source code not having a corresponding dependency pair in the baseline source code, when at least one source code segment of the at least one dependency pair is not included in the baseline source code, producing the notification according to the identifying.

Optionally, the notification is a first notification, when the at least one source code segment of the at least one dependency pair is not included in the baseline source code, wherein the notification is a second notification, when a first and a second source code segments of the at least one dependency pair are included in the baseline source code, and wherein the second notification is different than the first notification.

According to an aspect of some embodiments of the present invention there is provided a method for verifying correctness of application configuration of an application, comprising: receiving a source code of a client application having a set of plurality of application functionalities, the client application executed on a client terminal in communication with a server, obtaining a current context of the client application, receiving a plurality of access rules to the server, monitoring a plurality of traffic activities between the client terminal and the server, identifying within the plurality of traffic activities at least one violation of at least one of the plurality of access rules related to the current context, and conducting a corrective action in response to the identifying.

Optionally, the current context is a member of a group consisting of a user, a location and a network type.

Optionally, the corrective action is blocking access of a traffic activity causing the at least one violation and applying a new source code of the client application having a new set of plurality of application functionalities, the new set of plurality of application functionalities is configured not to allow the traffic activity.

According to an aspect of some embodiments of the present invention there is provided a system for verifying correctness of application configuration of an application, the system comprising: an input interface which receives baseline and changed source codes of an application, each when executed performs a plurality of application functionalities, a non-transitory storage medium for storing the received baseline and changed source codes and a program code, and a processor for executing the program code, wherein the processor is programmed to receive from the non-transitory storage medium the baseline and the changed source codes, for each of the baseline and changed source codes to generate a graph representation of an execution flow of a plurality of application functionalities performed by execution of a respective the source code, to analyze each of the graph representations to identify a plurality of functional dependencies between source code segments of the baseline source code and a plurality of functional dependencies between source code segments of the changed source code, wherein each of the plurality of functional dependencies is at least one of data dependency and control dependency, to identify a configuration discrepancy according to a match between plurality of functional dependencies of the changed source code when compared to the baseline source code and to produce a notification when the configuration discrepancy is found and the configuration discrepancy is not permitted by the configuration.

Optionally, the plurality of application functionalities each includes at least one member of a group consisting of application logics, user interface (UI), screens and screen controls.

Optionally, at least one of the graph representations includes at least one member of a group consisting of a control flow graph and a data flow graph.

Optionally, the application is a mobile application.

Optionally, at least one of the graph representations includes at least one state machine.

Optionally, at least one of the graph representations includes at least one member of a group consisting of symbolic representation and an abstract syntax tree.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
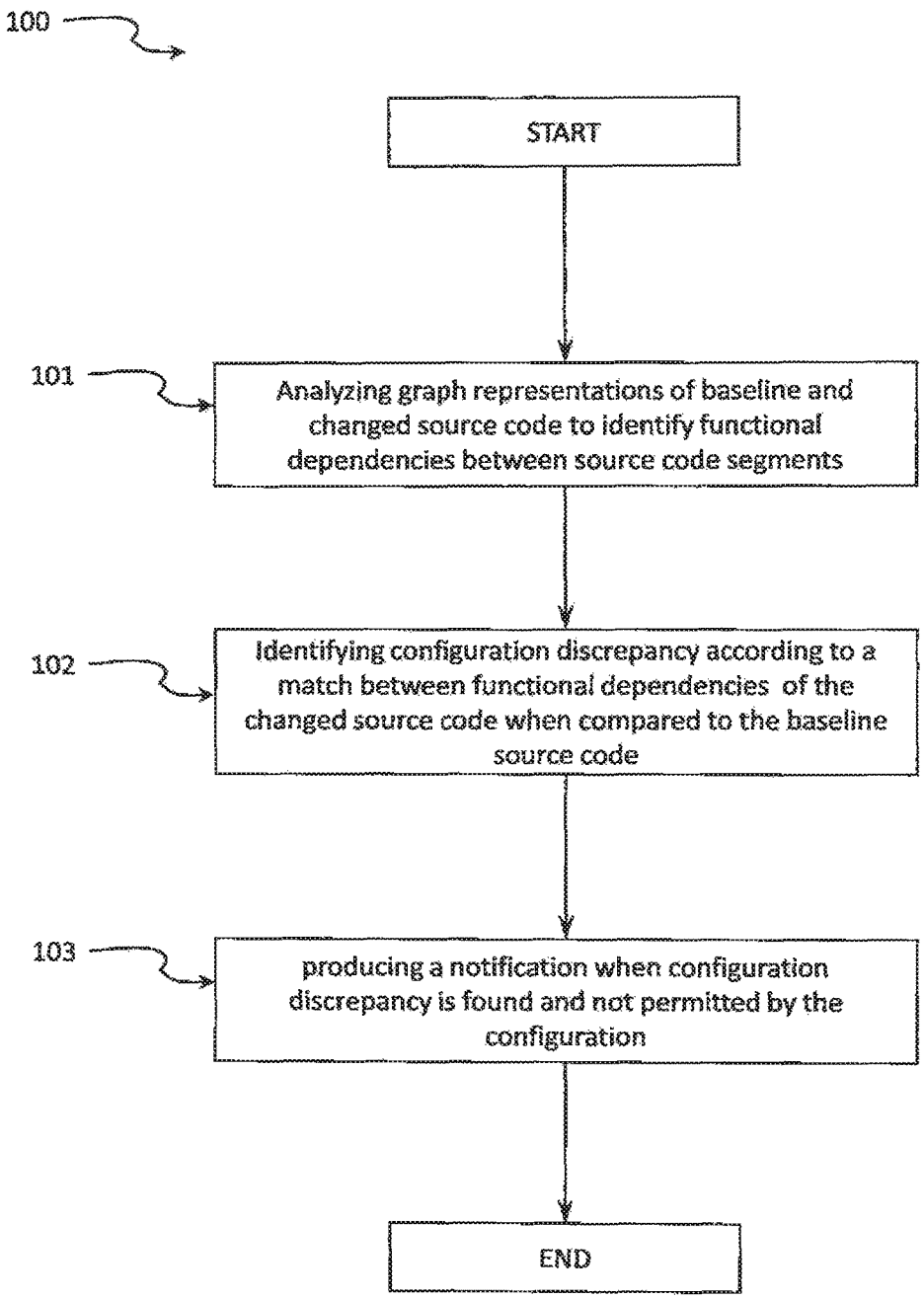
FIG. 1 is a flowchart of an exemplary process for verifying correctness of application configuration of an application, according to some embodiments of the present invention.

The present invention, in some embodiments thereof, relates to methods and systems for verifying application configuration of an application and, more particularly, but not exclusively, for identifying broken dependencies between source code segments of an application.

Common methods provide an application with a pre-defined set of application configurations. During the deployment of the application, the application dynamically loads a static configuration from the pre-defined set of configurations and changes its behavior accordingly.

However, there are several problems to these methods. When attempting to dynamically change a configuration of a mobile application in order to adapt the application to a specific use or environment of the mobile device, the source code that supports the new configuration may include broken links in the control flow of the execution of the source code, or unassigned variables in the data flow of the execution of the source code. Such situation is caused by an invalid state that the application includes. Execution of the code in such situation may lead to an execution failure, or to undefined or undesired outcome.

As used herein, the term application configuration of an application means a set of application functionalities available for a user of the application through the execution of the source code of the application.

As used herein, the term mobile application means an application executed on a mobile device for example a handheld device, a mobile phone, Personal Digital Assistant (PDA) and/or other devices alike.

Another problem is that a new applied configuration could result in an application that may violate a business rule of an organization where the application is being deployed—for example, the configuration could contain code that accesses a database in an unsecure context.

Some methods are for generating a valid sub-application of an original application, according to which given a set of source code segments in a source code of an originating application, the generated sub-application has a sub-set of the set of source code segments, and is functionally equivalent to the originating application in regards to the sub-set of source code segments.

However, this solution does not allow extending the application with additional source code segments without validation that there are no broken dependencies between the source code segments of the modified application.

As used herein, the term source code segment means a section of the source code responsible for providing a defined functionality of the application, when executed. Source code segment may be a piece of code that is added to a program A to get program A'. The source code segment is a sequence of statements. Different configurations of an application may include different sub sets of source code segments.

The present invention, in some embodiments thereof, identifies differences in dependencies of source code segments between the source code of an application before and after an invocation of a configuration, analyzes the differences and provides notification when the identified difference may cause broken links, or invalid states.

The differences that are identified are between dependency pairs identified in the two source codes of the application. A dependency pair is a pair of source code segments that one of them has dependency relationship to the other. A dependency may be a control dependency or data dependency. A control dependency of one source code segment to another source code segment is when an execution flow of the source code reaches the dependent source code segment according to a decision made in the other source code segment regarding the path to be taken in a next step of the execution. A data dependency of one source code segment to another source code segment is when a variable being used in a source code segment is being assigned a value in the other source code segment when the execution flow has an execution path leading from the source code segment assigning the value to the source code segment using the variable being assigned.

Dependency pair may include two statements (or expressions). Assuming a dependency pair {S1, S2}: S1 is, for example, a source statement in the pair, and S2 is, for example, a target statement in the pair.

As an example, assuming, an application referred to as A that contains two screens, referred to as S1 and S2, and a variable x that is initialized in S1 and is used in S2. The execution flow of application A includes a control path from S1 to S2. When the application reaches S2, the variable x has a value initialized in S1. In this example, assuming a different configuration of application A that is referred to as A'. A' contains a control path to S2 that bypasses S1. In such execution flow, variable x is not initialized before the execution flow reaches S2, or may be initialized by value other than it should have when initializing in S1. In this example A' has an uninitialized value for a variable.

In another example, assuming, an application referred to as A. Application A contains two screens S1 and S2, where S1 includes an authorization procedure to allow a user of the application to reach S2. In this example, assuming a different configuration of application A that is referred to as A'. A' contains a control path to S2 that bypasses S1. In this path, an unauthorized access to S2 is possible.

In the above two examples, the problem was that application configuration A' contains different dependencies than the dependencies in application configuration A. The present invention, in some embodiments thereof, is a method to identify and analyze the data and control dependencies of both configurations, A and A' and to look for differences between the dependencies in both configurations. When a difference is identified, it is determined whether it is allowed by the configuration. When it is allowed, the method ignores it. Otherwise, the method follows by the step of reporting a violation.

In another aspect of an embodiment of the present invention, the system serves as a proxy between the application and a server and ensures that there is no violation of rules when a new application configuration is applied.

The system is aware of the current context of the application and the configurations applied to the application and company rules. A current context of the application may be user identification (ID), user's location, the type of network used by the user when deploying the application.

Optionally, the system monitors traffic activities between the server and the client terminal. The system identifies rule violation by a traffic activity. Rules may be business or enterprise rules such as what type of requests the system allows for an application operated by certain users, which type of accesses to data bases, servers or other system resources are allowed from different types of networks. A rule may define that access to secured data bases are allowed only through the enterprise local area network (LAN), but not allowed through wireless networks like wireless LAN (WLAN) network or Bluetooth (BT) or other wireless networks. When the system identifies a violation of a rule, it conducts a corrective action. A corrective action may be blocking accesses to the network by the client terminal monitored for access requests of the type violated the rule. The corrective action may be applying a new application configuration to the application such that the new configuration prevents generating requests for the traffic activities identified as violating the rules. The corrective action may be modifying the application configuration like removing an activation button from the user interface of the application. Another example of a corrective action is applying a configuration with a screen being removed from the application.

In another, an application allows the user to access sensitive company data when using enterprise network only. A base configuration of the application is referred to as a 'Work Configuration'—when the user is using a client terminal connected to an enterprise network. A new application configuration is referred to as an 'Out of the Office Configuration'.

In the above example, when the user leaves the office, and the application is not aware that the configuration needs to be changed to 'Out of the Office', the user may try to access sensitive data through the application. The system blocks the access to the data and automatically applies an 'Out of the Office Configuration' instead of the 'Work Configuration'.

The present invention provides the ability to identify broken dependencies and violations of data assignments as described above, thus verifying that a new configuration of application that is applied is valid and correct. When the configuration is identified as including broken dependencies or unassigned variables, notification is produced. This is a feature of the present invention that provides a significant improvement to the functionality and performance of the client terminal, as invalid states of the executed application are prevented, and the execution of the application is not interrupted, stalled or generates undesired outputs. Additionally, the performance and safety of an enterprise network and server are improved by the prevention of the access of applications that violate business access rules, by reducing overload from the system managing the network that otherwise needs to repeatedly handle access violations and requests for unauthorized accesses.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 illustrates a flowchart of an exemplary process 100 for verifying correctness of application configuration of an application, according to some embodiments of the present invention. The verification is based on an analysis of the differences between source code segments dependencies in a base source code of an application, for example, to source code segments dependencies in another source code of the application after invocation of an application configuration.

Figure 2:
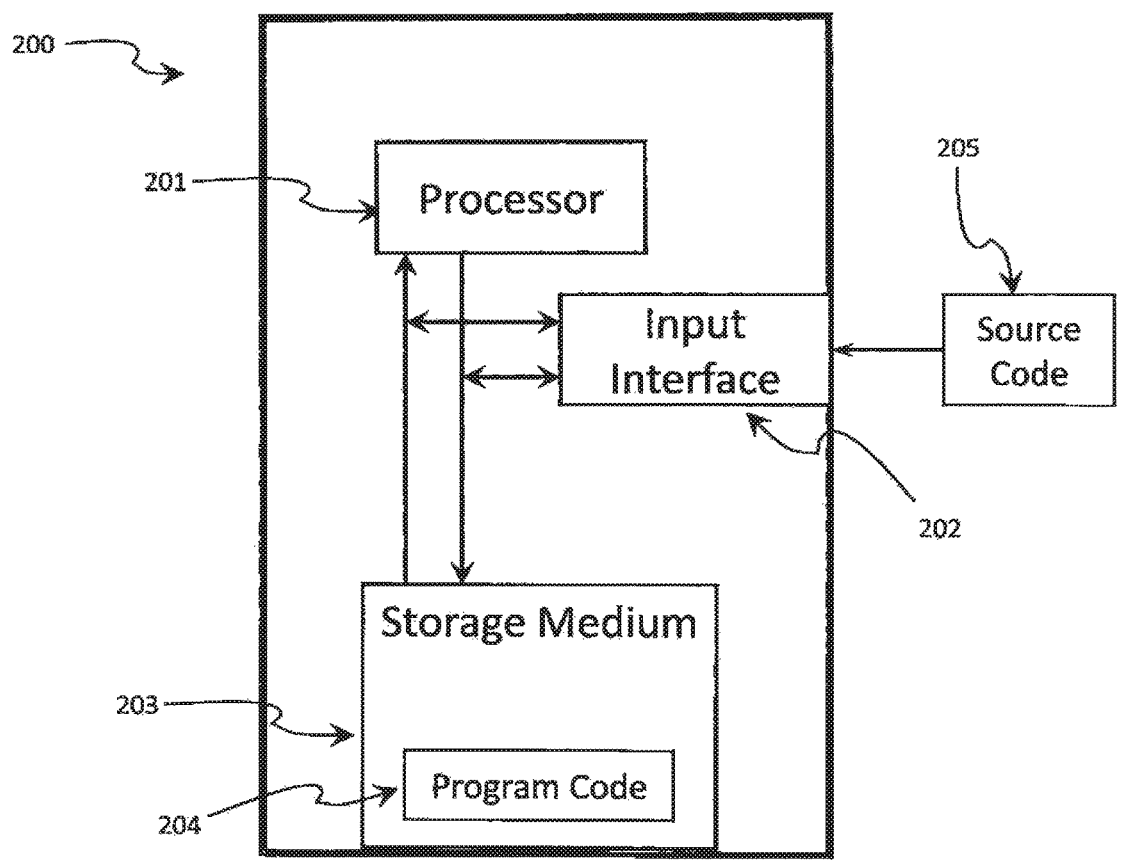
FIG. 2 is a schematic depiction of an exemplary system for verifying correctness of application configuration of an application, according to some embodiments of the present invention.

Reference is also made to FIG. 2, a schematic depiction of an exemplary system 200 for verifying correctness of application configuration of an application, according to some embodiments of the present invention.

Exemplary process 100 is executed by one or more processors 201 of system 200. The one or more processors 201 execute a program code 204 that is stored in a storage medium memory 203, program code 204 performing process 100, for example as an independent tool or as a feature of an existing platform such as an integrated development environment (IDE). A baseline source code of an application before invocation is stored in Storage Medium 203. A changed source code of the application after invocation of the application that provides a new configuration of the application is also stored in Storage Medium 203. Graph representations representing an execution flow of a plurality of application functionalities performed by execution of each of the baseline and the changed source codes are stored in the Storage medium 203.

The application may be a mobile application installed and executed on a mobile device like a cellular phone, portable computer, Personal Digital Assistant (PDA). The application may be an application for a non-mobile computing device installed and executed on a mobile or non-mobile device, like a personal computer, a laptop, or other computing device capable of being installed and execute applications. The baseline source code and the changed source code may include code for using resources like input components, processing components, output components, communication components, storage and the like. Each of the baseline and the changed source codes is comprised of a set of plurality of source code segments that when executed provide a plurality of application functionalities. Application functionalities may include application logics, user interface (UI), screens, screen controls and the like. Application logic refers, for example, to sequences of operations that the application performs in response to inputs the application receives, for example from the user through a user interface.

A graph representation of an execution flow of a plurality of application functionalities is a graph depicting an execution flow of the source code. The graph includes, for example, nodes and directive connectors connecting between nodes. Each node represents a source code segment responsible for an application's functionality. Each directive connector connects between two source code segments representing the execution flow from one of the source code segments to the other. The execution of the source code flows from one node to the other, representing a sequence of performed functionalities. When a node is a starting point to two different directive connectors, each connecting the node to a different node, the execution flow takes a path through one of the connectors or the other, according to a decision made in the execution of the source code segment represented by the starting node. An example of such decision may be a user input through the clicking on one of a multiple buttons available on a screen. When the user clicks on one button, a specific execution flow path is followed. When the user is clicking a different button, a different execution flow path may be followed.

Graph representation may include a control flow graph, a data flow graph, a combination of the above options and the like.

A data flow graph depicts an execution flow showing the operation made on data along the flow of the execution, like assignment of variables and use of variables in the different nodes. A control flow graph depicts the flow of the execution from one source code segment represented by a node to another source code segment represented by another node.

The graph representation may include symbolic representation, state machines and abstract syntax tree. A syntax tree is a tree representation of the abstract syntactic structure of source code or source code segments.

Figure 3A:
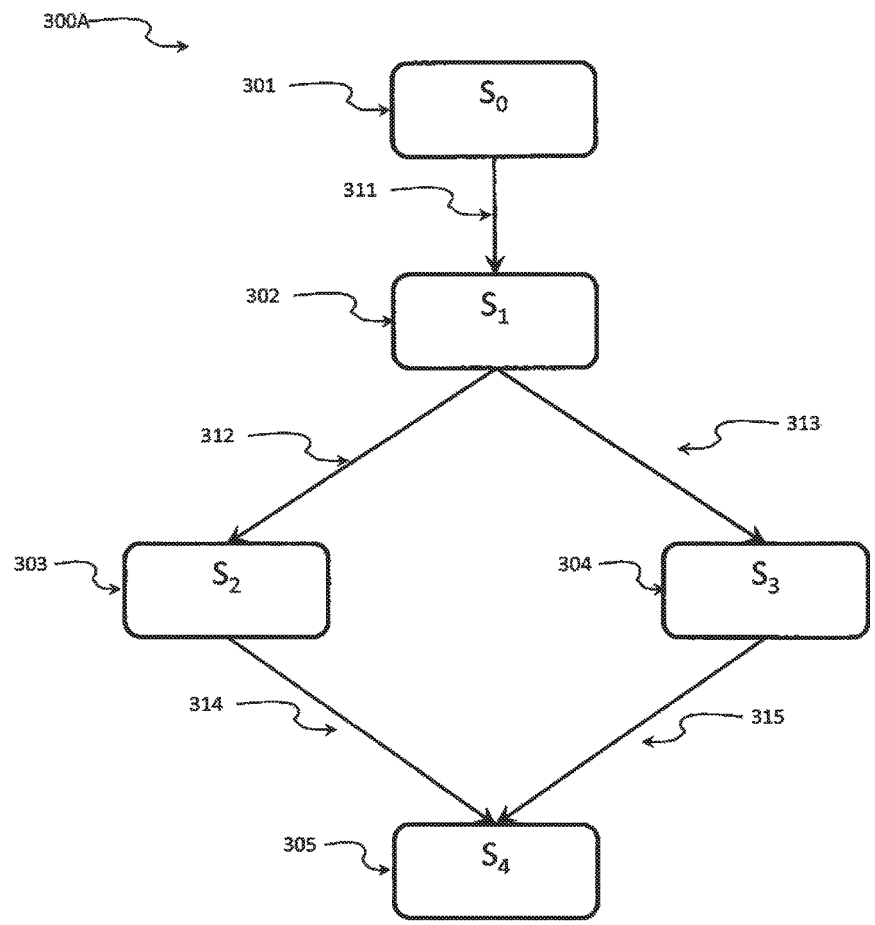
FIG. 3A is an example of control dependency graph of a base execution flow of a plurality of application functionalities of an application, according to some embodiments of the present invention.

Reference is now made to FIG. 3A, and exemplary depiction of control dependency graph of an execution flow. As can be seen, the graph 300A includes 5 nodes 301, 302, 303, 304 and 305. The graph also includes 5 directive connectors 311, 312, 313, 314 and 315. As shown in graph 300A, directive connector 311, for example, is connecting between node 301 and node 302 such to describe an execution flow starting from node 301 and ending at node 302. Similarly, directive connector 312 is connecting between node 302 and node 303 such to describe an execution flow starting from node 302 and ending at node 303 etc.

Reference in now made again to FIG. 1 and FIG. 2.

As is shown in 101, by executing the program code 204, the processor 201 of system 200 analyzes the graph representations of the baseline and the changed source codes to identify functional dependencies between source code segments of the baseline source code and functional dependencies between source code segments of the changed source code. Optionally, the analysis defines for each of the baseline and the changed source codes dependency pairs. As explained above, a dependency pair comprises two source code segments where one of the source code segments functionally depends on the other source code segment. A functional dependency may be data dependency, control dependency, or both. A control dependency of one source code segment to another source code segment is when an execution flow of the source code reaches the dependent source code segment according to a decision made in the other source code segment regarding the path to be taken in a next step of the execution. A data dependency of one source code segment to another source code segment is when a variable being used in a source code segment is being assigned a value in the other source code segment when the execution flow has an execution path leading from the source code segment assigning the value to the source code segment using the variable being assigned.

Then, as shown in step 102, the processor 201, identifies a configuration discrepancy according to a match between the functional dependencies of the changed source code when compared to the functional dependencies of the baseline source code. The match may be when a dependency pair of the changed source code has a corresponding dependency pair in the baseline source code.

Optionally, process 100 includes the step of checking the dependency pairs that were found in the changed source code but not in the baseline source code, to identify when at least one of the code segments of the dependency pair is not included in the baseline source code. A source code segment that is included in the changed source code and not in the baseline source code, accounts for an application functionality that was added to the application configuration after its invocation, as it was not included in the baseline source code, before application invocation.

Finally, as can be seen in step 103, a notification is produced by the processor 201, when a configuration discrepancy is found. By producing such notification, the system alerts that a potential link is broken, or a variable assignment is not similar between the two source codes and a corrective action needs to be taken to fix the code. A notification may take shape of an error message, an interrupt to the system, a program call to an error handling routine or the like.

Optionally, the system produces different notifications in different cases. One case may be, when the dependency pair that was identified in the changed source code and was not identified in the baseline source code includes a source code segment that is not included in the baseline source code. Another case may be, when both source code segments of a dependency pair of the changed source code are included in the baseline source code. This differentiation in the notifications provides a different alert in the different cases. For example, a "Warning" notification is produced in the first case, and an "Error" notification may be produced in the other case.

Optionally, the producing of the notification related to a dependency pair depends on the application configuration definition description allowing or not allowing such dependency pair in the changed source code that is not included in the baseline source code.

As shown in FIG. 2, a source code 205 may be received through an input interface 202 and is stored in storage medium 203. The source code 205 is, for example, the baseline source code of the application, before a configuration is invoked, or the changed source code of the application. A source code may be received through the input interface by data communication between the mobile device and the system 200, when the application is invoked on the mobile device. The communication may be over a wireless communication like wireless local area network (WLAN), BlueTooth (BT), infrared (IR) or the like.

The graph representations of the baseline source code and the changed source code may be generated by the processor 201 after the receiving of the baseline source code and the changed source code that are stored after their receipt in the storage medium 203.

Reference is now made to FIG. 3A, a first exemplary control dependency graph of an execution flow of a plurality of application functionalities of an application, according to some embodiments of the present invention.

Dependency graph 300A depicts an execution flow of an application that includes five application functionalities, each of them performed by the execution of a source code segment, and represented in the graph as nodes: $S_0$ 301, $S_1$ 302, $S_2$ 303, $S_3$ 304, and $S_4$ 305. Dependency graph 300 may be of a baseline application code, before configuration invocation. The application functionalities 301-305 are, for example, five different screens of the application presented on the client terminal. The transition from one screen to the other is done by the execution of the source code of the application, and according to, for example, inputs received from the user through touch clicking, or other input means. The transitions from one screen to the other are represented in the graph as directive connectors 311, 312, 313, 314 and 315. When the execution starts, a first screen is presented $S_0$. The execution flow is at node 301. In the execution flow a transition to a next screen is done, along directive connector 311, and the flow continues to screen $S_1$, represented by node 302. Next, the execution flow has two possible paths of execution starting from $S_1$—node 302. A first possible path is to screen $S_2$ 303 along directive connector 312. A second possible path is to screen $S_3$—node 304 along directive connector 313. The execution path that is selected depends, for example, on different inputs and type of inputs received from the user. A user may choose to click on a certain button of screen $S_1$ 302, that in response to this action, the execution takes the path to screen $S_2$ 303 that is now being presented to the user. In such example, when the user chooses to click on a different button of screen $S_1$ 302, in response to this operation, the execution takes the path to screen $S_3$ 304. According to the execution flow depicted in the control flow graph 300A, the screen following either $S_2$ 303 or $S_3$ 304 is $S_4$ 305.

Figure 3B:
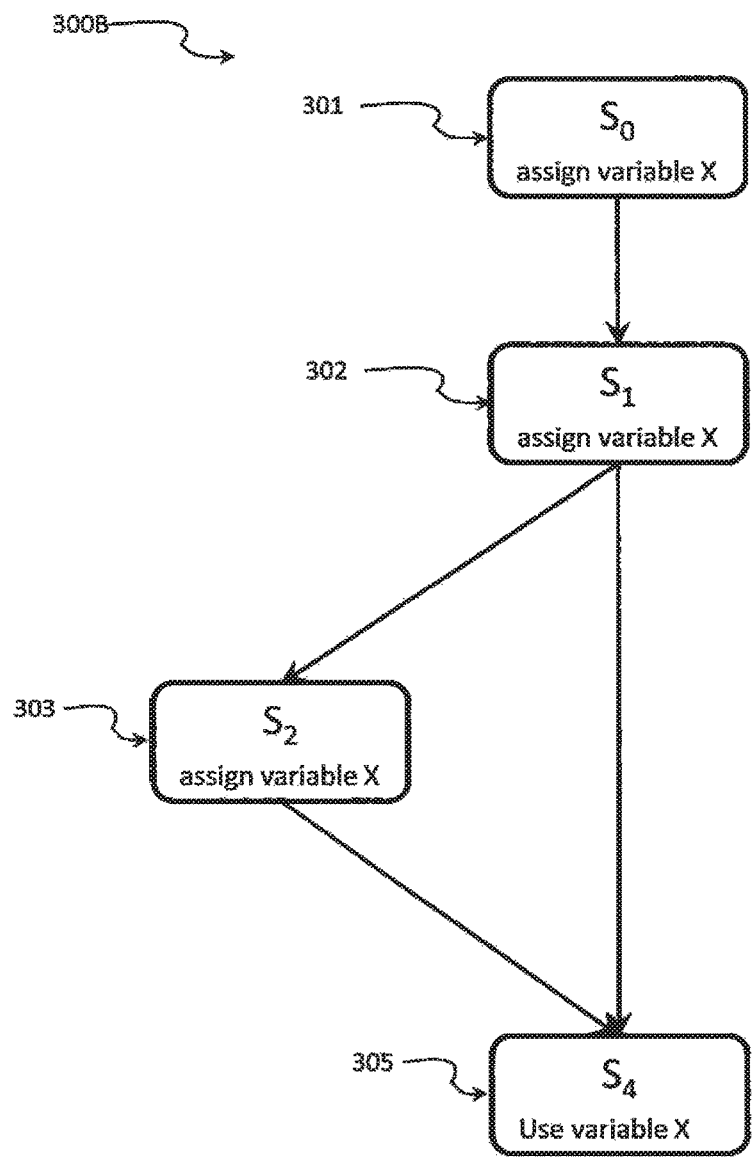
FIG. 3B is an example of data dependency graph of a base execution flow of a plurality of application functionalities of an application, according to some embodiments of the present invention.

Reference is also made to FIG. 3B, a first exemplary data dependency graph of an execution flow of a plurality of application functionalities of an application, according to some embodiments of the present invention.

Data dependency graph 300B describes data dependencies of the same source code described in control flow graph 300A of FIG. 3A. In the execution of $S_0$ 301, a variable X is being assigned a value. In the execution flow a transition to a next screen is done, and the flow continues to screen $S_1$, represented by node 302. In the execution of $S_1$ 302, the variable X is being assigned a value. This value may be the same value as the assignment in $S_0$ 301, or may be a different value. Next, according to graph 300A the execution flow has two possible paths of execution starting from $S_1$—node 302. A first possible path is to screen $S_2$ 303 and a second possible path is to screen $S_3$—node 304. When the execution path is to $S_2$ 303, the variable X is assigned a value. This assigned value may be different or similar to the assignment of variable X done in $S_1$ 302. However, when the execution leads to $S_3$ 304, according to graph 300A, variable X does not get assigned. In such case, variable X has the value assigned to it in $S_1$ 302. As $S_3$ 304 does not assign a value to variable X and does not use the variable X, the screen $S_3$ 304 is not included in the data dependency graph 300B. As an example, variable X may define a screen background color. In every one of the screens $S_0$ 301, $S_1$ 302 and $S_2$ 303 the background color variable may get a different value after the assignment of variable X. According to the execution flow depicted in the control flow graph 300A, the screen following either $S_2$ 303 or $S_3$ 304 is $S_4$ 305. In $S_4$ 305, variable X is being used. Using the example of variable X as a background color, the background color of the display of the client terminal is changed according to the value of variable X when the execution flow reaches $S_4$ 305. This background color is determined according to the assignment of variable X in $S_2$ 303, when the execution flow takes the path through $S_2$ 303, but the background color is determined according to the assignment of variable X in $S_1$ 302, when the execution flow takes the path through $S_3$ 304, thus the screen color used in $S_4$ 305 depends on the path taken during the execution. Data dependency graph 300B shows that the value of variable X when used in $S_4$ 305 depends on the execution path, and is either defined in $S_1$ 302 or in $S_2$ 303.

Analyzing the graph 300A and graph 300B produces the following dependency pairs of screens $S_0$-$S_4$:

{$S_4$, $S_2$}—a data dependency pair denoting that the value of variable X used in $S_4$ depends on the assignment of variable X in $S_2$.

{$S_4$, $S_1$}—a data dependency pair denoting that the value of variable X used in $S_4$ depends on the assignment of variable X in $S_1$.

{$S_2$, $S_1$}—a control dependency pair denoting that the screen $S_2$ is presented to the client terminal depending on a flow control decision conducted in the execution of $S_1$.

{$S_3$, $S_1$}—a control dependency pair denoting that the screen $S_3$ is presented to the client terminal depending on a flow control decision conducted in the execution of $S_1$.

Figure 4A:
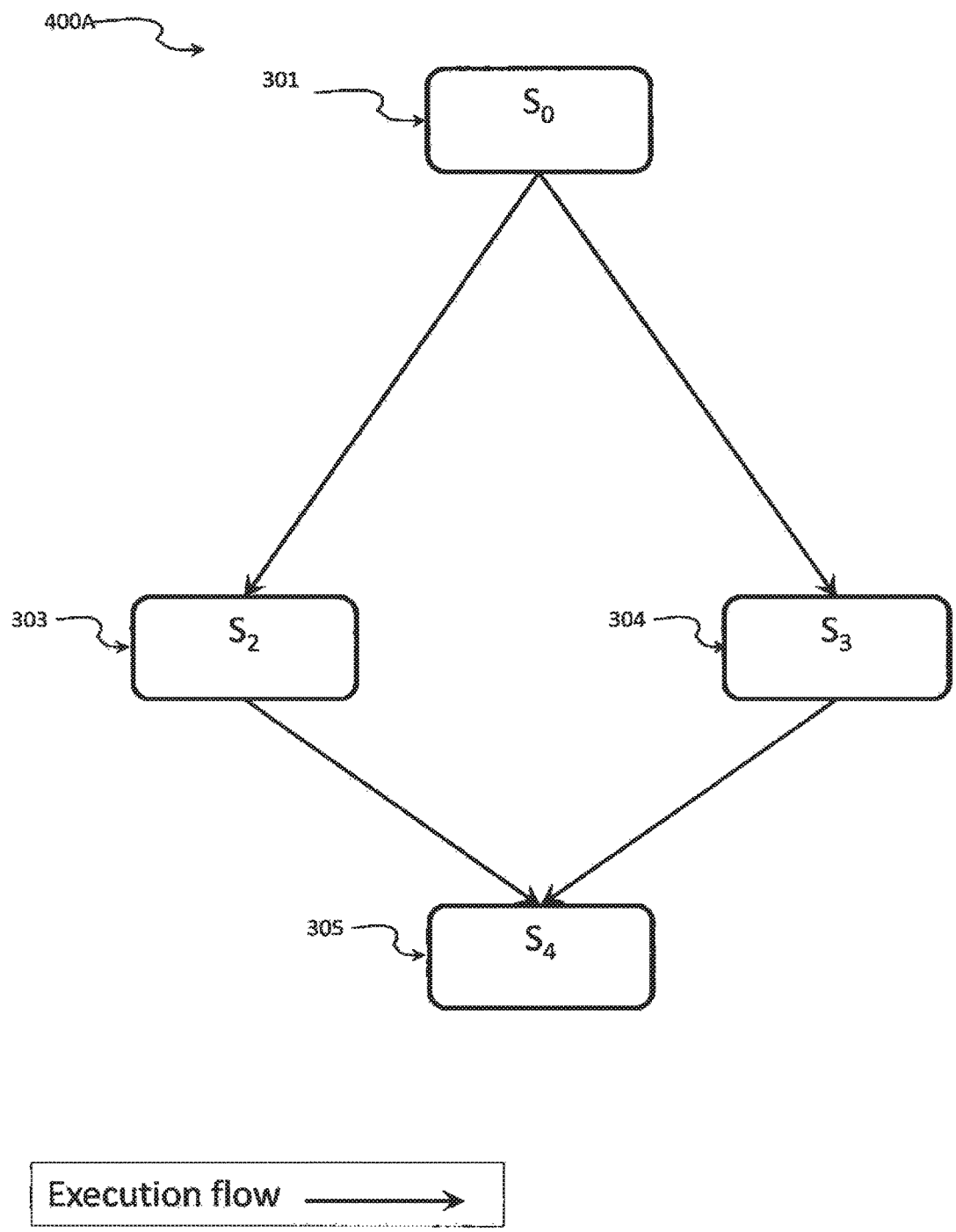
FIG. 4A is an example of control dependency graph of another execution flow of a plurality of application functionalities of an application, according to some embodiments of the present invention.

Reference is now made to FIG. 4A, another exemplary control dependency graph of an execution flow of a plurality of application functionalities of an application, according to some embodiments of the present invention.

Dependency graph 400A depicts an execution flow of an application that includes four application functionalities, each of them performed by the execution of a source code segment, and represented in the graph as nodes: $S_0$ 301, $S_2$ 303, $S_3$ 304, and $S_4$ 305. Dependency graph 400A may be a modification of the application code represented in graph 300A, modified by the configuration invocation. As can be seen, application functionality $S_1$ 302 of dependency graph 300A in FIG. 3A, or screen as in the example, is removed and is not included in the execution flow depicted in dependency graph 400A. When the execution starts, a first screen is presented $S_0$ 301. The execution flow now has two possible paths of execution starting from $S_0$ 301. A first possible path is to screen $S_2$ 303. A second possible path is to screen $S_3$ 304. The execution path that is selected depends, for example, on different inputs and type of inputs provided by the user. For example, a user chooses to click on a certain button of screen $S_0$ 301, that in response to this action, the execution takes the path to screen $S_2$ 303 that is now presented to the user. In such example, when the user chooses to click on a different button of screen $S_0$ 301, in response to this operation, the execution takes the path to screen $S_3$ 304. According to the execution flow depicted in the control flow graph 400A, the screen following either $S_2$ 303 or $S_3$ 304 is $S_4$ 305.

Figure 4B:
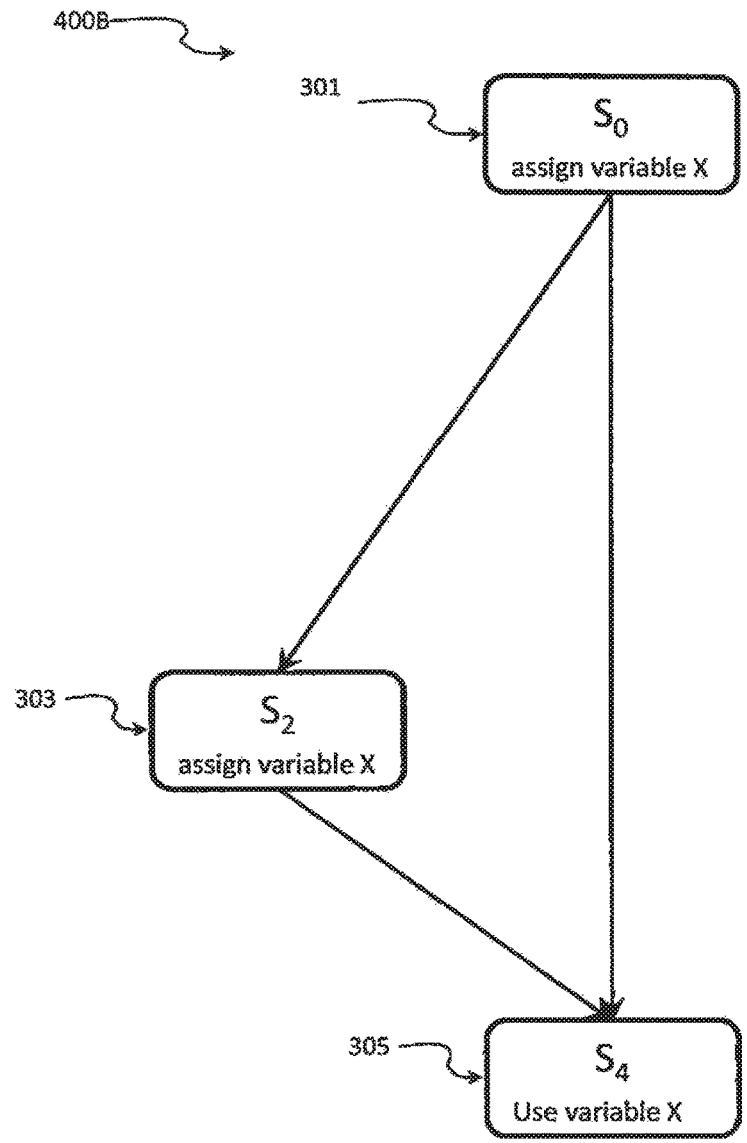
FIG. 4B is an example of data dependency graph of another execution flow of a plurality of application functionalities of an application, according to some embodiments of the present invention.

Reference is also made to FIG. 4B, another exemplary data dependency graph of an execution flow of a plurality of application functionalities of an application, according to some embodiments of the present invention.

Data dependency graph 400B describes data dependencies of the same source code described in control flow graph 400A of FIG. 4A. In the execution of $S_0$ 301, the variable X is being assigned a value. As described above the execution flow now has two possible paths of execution starting from $S_0$ 301. A first possible path is to screen $S_2$ 303. A second possible path is to screen $S_3$ 304. When the execution path is to $S_2$ 303, the variable X is assigned a value. This assigned value may be different or similar to the assignment of variable X done in $S_0$ 301. However, when the execution leads to $S_3$ 304, variable X does not get assigned. In such case, variable X has the value assigned to it in $S_0$ 301. As variable X does not get assigned a value and is not used in $S_3$ 304, the node $S_3$ 304 does not appear in graph 400B. According to the execution flow depicted in the control flow graph 400A, the screen following either $S_2$ 303 or $S_3$ 304 is $S_4$ 305. In $S_4$ 305, variable X is being used. Using the example of variable X as a background color, the background color of the display of the client terminal is changed according to the value of variable X when the execution flow reaches $S_4$ 305 where the variable X is being used. This background color is determined according to the assignment of variable X in $S_2$ 303, when the execution flow takes the path through $S_2$ 303, but the background color is determined according to the assignment of variable X in $S_0$ 301, when the execution flow takes the path through $S_3$ 304, thus the screen color used in $S_4$ 305 depends on the path taken during the execution.

Analyzing the graph 400A and graph 400B produces the following dependency pairs of screens $S_0$, $S_2$, $S_3$ and $S_4$:

$\{S_4, S_2\}$—a data dependency pair denoting that the value of variable X used in $S_4$ depends on the assignment of variable X in $S_2$.

$\{S_4, S_0\}$—a data dependency pair denoting that the value of variable X used in $S_4$ depends on the assignment of variable X in $S_0$.

$\{S_2, S_0\}$—a control dependency pair denoting that the screen $S_2$ is presented to the client terminal depending on a flow control decision conducted in the execution of $S_0$.

$\{S_3, S_0\}$—a control dependency pair denoting that the screen $S_3$ is presented to the client terminal depending on a flow control decision conducted in the execution of $S_0$.

As an example, referring now to the above graphs 300A, 300B and graphs 400A and 400B, according to process 100, the analysis of graphs 300A and 300B and of graphs 400A and 400B to identify functional dependencies is conducted in step 101 of process 100, by the processor 201. The analysis may further identify dependency pairs in each of the graphs 300A, 300B and 400A and 400B. In this example, as in step 102 of process 100, the next step is to identify a configuration discrepancy according to a match between the functional dependencies of graphs 400A and 400B when compared to the functional dependencies of graphs 300A and 300B respectively. The match is, for example, when a dependency pair of graph 400A has a corresponding dependency pair in graph 300A. As can be seen from the list of dependency pairs above, dependency pair $\{S_4, S_2\}$ is the only dependency pair of graph 400B that has a corresponding dependency pair in graph 300B. A notification is produced for dependency pairs $\{S_4, S_0\}$, $\{S_2, S_0\}$ and $\{S_3, S_0\}$ since none of the three dependency pairs found in graphs 400A and 400B has a corresponding dependency pair in graphs 300A and 300B. Optionally, the source code segments of each of the three dependency pairs are identified whether they are included in the set of source code segments of graph 300A. In the above example, all the source code segments $S_0$, $S_2$, $S_3$ and $S_4$ are included in the source code segments of graph 300A. Optionally, in this example, the notification that is produced for $\{S_4, S_0\}$, $\{S_2, S_0\}$ and $\{S_3, S_0\}$ is an ERROR notification. Optionally, the notification is produced for each of the dependency pairs $\{S_4, S_0\}$, $\{S_2, S_0\}$ and $\{S_3, S_0\}$ when such respective dependency pair is not permitted by the application configuration description.

Figure 5A:
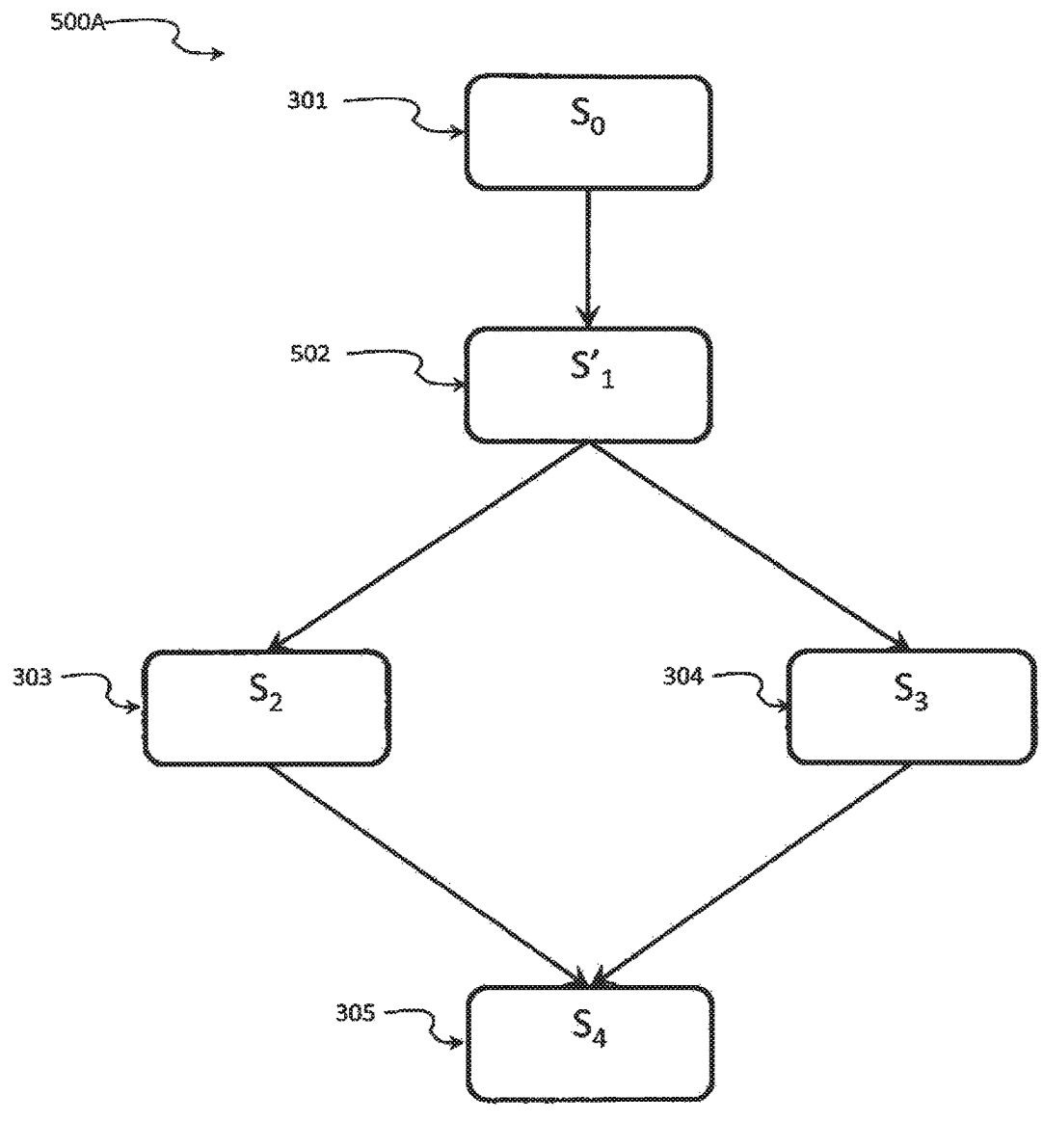
FIG. 5A is an example of control dependency graph of a third execution flow of a plurality of application functionalities of an application, according to some embodiments of the present invention.

Reference is now made to FIG. 5A, a third exemplary control dependency graph of an execution flow of a plurality of application functionalities of an application, according to some embodiments of the present invention.

Dependency graph 500A depicts an execution flow of an application that includes five application functionalities, each of them performed by the execution of a source code segment, and represented as nodes: $S_0$ 301, $S'_1$ 502, $S_2$ 303, $S_3$ 304, and $S_4$ 305. Dependency graph 500A may be another modification of the application code represented in graph 300A, modified by the configuration invocation. As can be seen, application functionality $S_1$ 302, or screen as in the example, is replaced by application functionality $S'_1$ 502 in the execution flow of graph 500A. This replacement means a new source code segment that was not included in graph 300A. In this example, when the execution starts, a first screen is presented $S_0$ 301. In the execution flow a transition to a next screen is done, and the flow continues to screen $S'_1$ 502. Next, the execution flow has two possible paths of execution starting from $S'_1$ 502. A first possible path is to screen $S_2$ 303. A second possible path is to screen $S_3$ 304. The execution path that is selected depends, for example, on different inputs and type of inputs provided by the user. For example, a user chooses to click on a certain button of screen $S'_1$ 502, that in response to this action, the execution takes the path to screen $S_2$ 303 that is now being presented to the user. In such example, when the user chooses to click on a different button of screen $S'_1$ 502, in response to this operation, the execution takes the path to screen $S_3$ 304. According to the execution flow depicted in the data and control flow graph 500A, the screen following either $S_2$ 303 or $S_3$ 304 is $S_4$ 305.

Figure 5B:
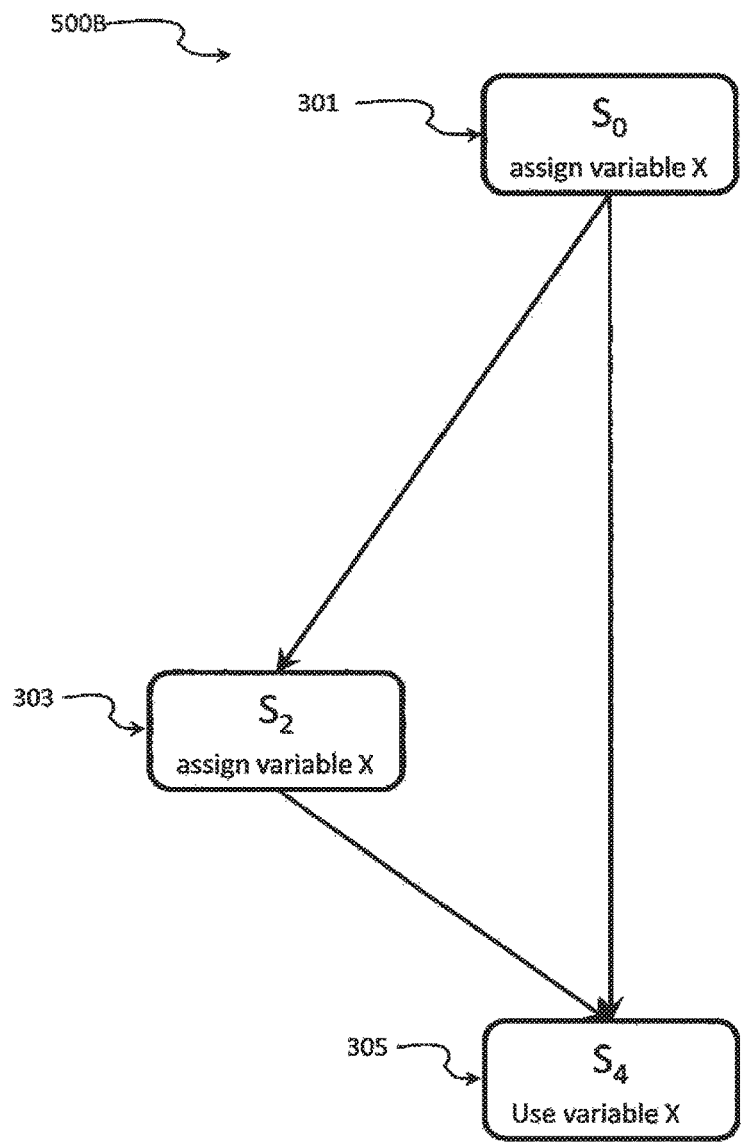
FIG. 5B is an example of data dependency graph of a third execution flow of a plurality of application functionalities of an application, according to some embodiments of the present invention.

Reference is also made to FIG. 5B, a third exemplary data dependency graph of an execution flow of a plurality of application functionalities of an application, according to some embodiments of the present invention.

Data dependency graph 500B describes data dependencies of the same source code described in control flow graph 500A of FIG. 5A. In the execution of $S_0$ 301, the variable X is being assigned a value. According to the control flow graph 500B, in the execution flow a transition to a next screen is done, and the flow continues to screen $S'_1$ 502. Unlike $S_1$ 302 of graph 300B, the variable X is not being assigned a value in $S'_1$, therefore $S'_1$ is not included in data dependency graph 500B. According to the control flow graph 500A, the execution flow has two possible paths of execution starting from $S'_1$ 502. A first possible path is to screen $S_2$ 303. A second possible path is to screen $S_3$ 304. When the execution path is to $S_2$ 303, the variable X is assigned a value. This assigned value may be different or similar to the assignment of variable X done in $S_0$ 301. However, when the execution leads to $S_3$ 304, variable X does not get assigned. In such case, variable X has the value assigned to it in $S_0$ 301. As variable X does not get assigned in $S_3$ 304, and is not being used in $S_3$ 304, node $S_3$ 304 is not included in data dependency graph 500B. According to the execution flow depicted in the control flow graph 500A, the screen following either $S_2$ 303 or $S_3$ 304 is $S_4$ 305. In $S_4$ 305, variable X is being used. Using the example of variable X as a background color, the background color of the display of the client terminal is changed according to the value of variable X when the execution flow reaches $S_4$ 305 where the variable X is being used. This background color is determined according to the assignment of variable X in $S_2$ 303, when the execution flow takes the path through $S_2$ 303, but the background color is determined according to the assignment of variable X in $S_0$ 301, when the execution flow takes the path through $S_3$ 304, thus the screen color used in $S_4$ 305 depends on the path taken during the execution.

Analyzing the graphs 500A and 500B yields the following dependency pairs of screens $S_0$, $S'_1$, $S_2$, $S_3$ and $S_4$:

- $\{S_4, S_2\}$—a data dependency pair denoting that the value of variable X used in $S_4$ depends on the assignment of variable X in $S_2$.
- $\{S_4, S_0\}$—a data dependency pair denoting that the value of variable X used in $S_4$ depends on the assignment of variable X in $S_0$.
- $\{S_2, S'_1\}$—a control dependency pair denoting that the screen $S_2$ is presented to the client terminal depending on a flow control decision conducted in the execution of $S'_1$.
- $\{S_3, S'_1\}$—a control dependency pair denoting that the screen $S_3$ is presented to the client terminal depending on a flow control decision conducted in the execution of $S'_1$.

As an example, referring to the above graphs 300A and 300B and graphs 500A and 500B, according to process 100, the analysis of graphs 500A and 500B and of graphs 300A and 300B to identify functional dependencies is conducted in step 101 of the process 100, by the processor 201. The analysis may further identify dependency pairs in each of the graphs 300A, 300B and 500A and 500B. In this example, as in step 102 of process 100, the next step in is to identify a configuration discrepancy according to a match between the functional dependencies of graphs 500A and 500B when compared to the functional dependencies of graphs 300A and 300B respectively. The match is, for example, when a dependency pair of graph 500A has a corresponding dependency pair in graph 300A. As can be seen from the list of dependency pairs above, dependency pair $\{S_4, S_2\}$ is the only dependency pair of graph 500B that has a corresponding dependency pair in graph 300B. A notification is produced for dependency pairs $\{S_4, S_0\}$, $\{S_2, S'_1\}$ and $\{S_3, S'_1\}$ since none of the three dependency pairs found in graphs 500A and 500B has a corresponding dependency pair in graphs 300A and 300B. Optionally, the source code segments of each of the three dependency pairs are identified whether they are included in the set of source code segments of graph 300A. In the above example, source code segment $S'_1$ is not included in the source code segments of graph 300A. Optionally, the notification that is produced for $\{S_4, S_0\}$ is an ERROR notification and the notification produced for $\{S_2, S'_1\}$ and $\{S_3, S'_1\}$ is a WARNING notification. Optionally, the notification is produced for each of the dependency pairs $\{S_4, S_0\}$, $\{S_2, S'_1\}$ and $\{S_3, S'_1\}$ when such respective dependency pair is not permitted by the application configuration description.

Figure 6:
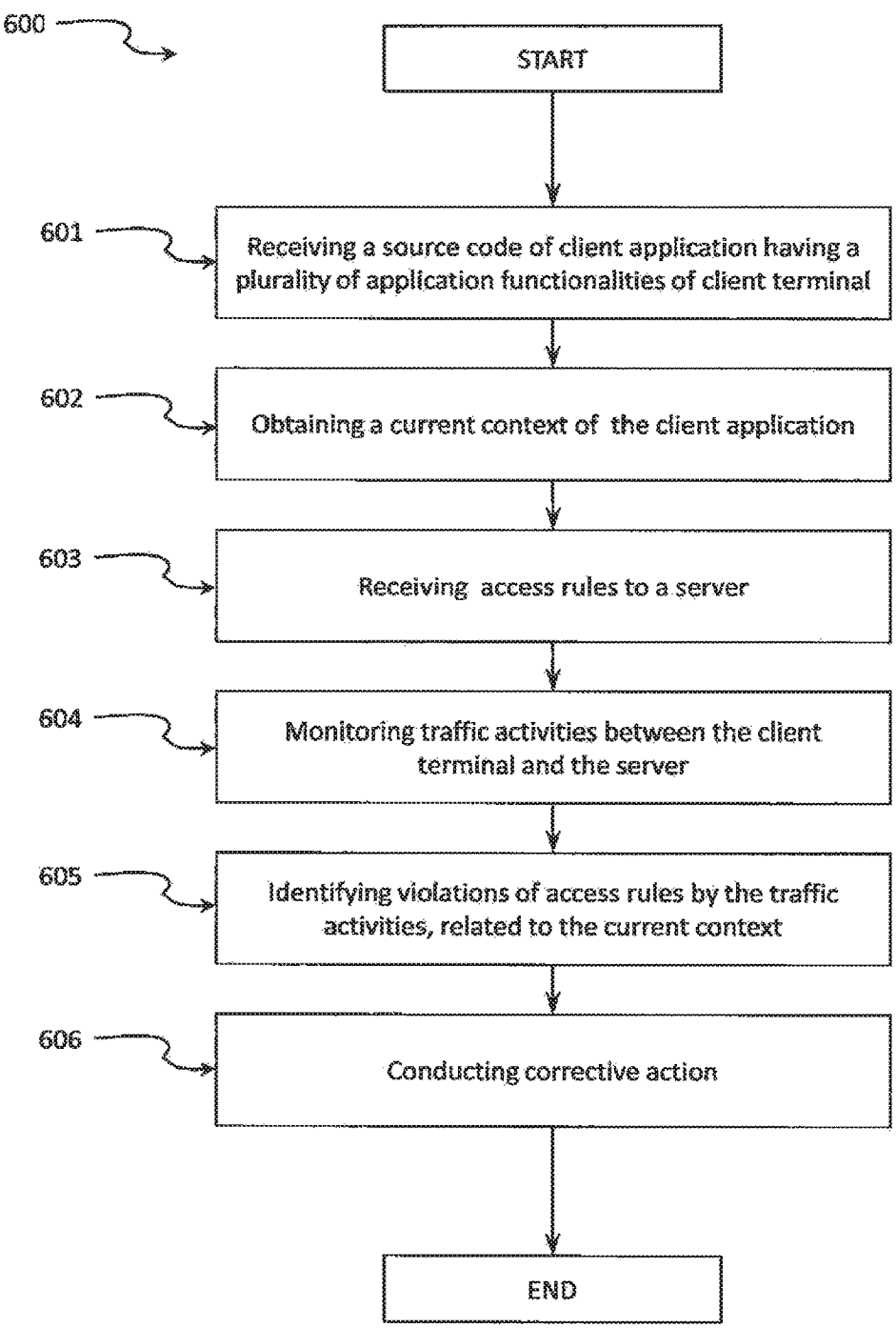
FIG. 6 is a flowchart of another exemplary process for verifying correctness of application configuration of an application, according to some embodiments of the present invention.

Reference is now made to FIG. 6, another flowchart of an exemplary process 600 for verifying correctness of application configuration of an application, according to some embodiments of the present invention.

Optionally, the application is a mobile application.

Exemplary process 600 is executed, for example, by one or more processors 201 of system 200. The processor 201 executes a program code 204 that is stored in a storage medium memory 203 and performs process 600, for example as an independent tool or as a feature of an existing platform such as an integrated development environment (IDE).

As shown in 601, a source code 205 of a client application is received, for example, by input interface 202 and stored in the storage medium 203. The source code may be received through the input interface for example by data communication between the mobile device and the system 200, when the application is invoked on the mobile device. The communication may be over a wireless communication like wireless local area network (WLAN), BlueTooth (BT), infrared (IR) or the like. Next, in step 602 a current context of the client application is obtained. The current context may be user identification (ID), a location where a user is deploying the application or a network type through which the application being deployed by the user is communicating with a server or other network resources or computing devices. In step 603 access rules to a server are received. In an enterprise environment there might be business rules for how to use the network resources, which users are authorized to use different resources, different access levels, etc. Also, access to the enterprise server may be restricted also when accessing from different locations, from inside or outside the work environment and the like. Additionally, access from different types of network, for example wired or wireless may be granted different levels of access. Next, in step 604, traffic activities between the client terminal and the server are monitored. Traffic activities that are monitored are checked to identify when an activity is violating a business rule. For example, business rule defines when a user may be granted authorization to access the data on the enterprise server. Such authorization may depend on the user identity, on the user location when using the application that tries to access the data server, and on the type of network the client terminal is using. For example, a user is permitted to access the data server when he is using his client terminal connected to the wired network inside the enterprise premises, but he may not be permitted to access the data server through wireless connection, or when he is out of the enterprise's premises. Using the current context and the business rules the system identifies traffic activities that in the current context violate business rules. When a violation of business rule is identified, the system 200 conducts a corrective action, in step 606. Corrective action may be blocking access of similar traffic activities of the application to the server. The system may apply a different source code for the application, in a configuration that does not include application functionalities that cause traffic activities similar to the activities identified as violating the business rules. As an example, an application is designed to allow access to sensitive company data when using enterprise network only. The application may have two configurations: 'Work Configuration'—when a user is on enterprise network and 'Out of the Office Configuration' otherwise. In this example, a user leaves the office, but the application is not aware that the configuration used in the office has to be changed from 'Work Configuration' to 'Out of the Office Configuration'. According to this example, the user tries to access sensitive data using the application when he is out of the office, but using a configuration that allows access, an operation that is restricted to the office area and network only. The system identifies that the user is connected from outside the network and the offices and blocks the access to it. Additionally or alternatively, the system applies to the client terminal an 'Out of the Office Configuration' instead of 'Work Configuration' to enable the user to continue using the application, but in a restricted and limited mode that does not violate the business rules.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant software engineering methodologies will be developed and the scope of the terms such as dependency graph, application configuration and execution flow is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A method for improving functionality and performance of a client terminal by verifying correctness of application configuration of an application, comprising:

for each of baseline source code and changed source code of an application for a client terminal, analyzing a graph representation of an execution flow of a plurality of application functionalities performed by execution of a respective said source code;

identifying by said analysis a plurality of baseline functional dependencies between source code segments of said baseline source code, wherein each of said baseline functional dependencies defines a dependency between one of said baseline source code segments and another one of said baseline source code segments;

defining a plurality of baseline dependency pairs, each defined for another one of said plurality of identified baseline functional dependences, wherein each of said plurality of baseline dependency pairs comprises two code segments of said baseline source code, wherein a second of said two code segments depends on a first of said two code segments;

identifying by said analysis a plurality of functional dependencies between source code segments of said changed source code, wherein each of said functional dependencies defines a dependency between one of said changed source code segments and another one of said changed source code segments, wherein each of said plurality of functional dependencies and said plurality of baseline functional dependencies is at least one of data dependency and control dependency;

defining a plurality of changed source code dependency pairs, each defined for another one of said plurality of identified changed source code functional dependencies, wherein each of said plurality of changed source code dependency pairs comprises two code segments of said changed source code, wherein a second of said two code segments depends on a first of said two code segments;

comparing functional dependencies of the baseline dependency pairs with the changed source code dependency pairs and identifying one or more matches when a baseline dependency pair has a corresponding changed source code dependency pair in the baseline source code;

identifying a configuration discrepancy according to the comparison when a dependency pair does not have a corresponding dependency pair match or identifying one or more dependency pairs in the changed source code which are not permitted by the application configuration;

generating at least one of a system of a system interrupt or an error message as a notification, when said configuration discrepancy is identified.

2. The method of claim 1 further comprising:
receiving said baseline source code and said changed source code; and
generating each of said graph representations.

3. The method of claim 1, wherein said plurality of application functionalities includes at least one member of a group consisting of application logics, user interface (UI), screens and screen controls.

4. The method of claim 1, wherein at least one of said graph representations includes at least one member of a group consisting of a control flow graph and a data flow graph.

5. The method of claim 1, wherein at least one of said graph representations includes at least one state machine.

6. The method of claim 1, wherein at least one of said graph representations includes at least one member of a group consisting of symbolic representation and an abstract syntax tree.

7. The method of claim 1, wherein said application is a mobile application.

8. The method of claim 1, wherein said changed source code includes at least one source code segment not included in said baseline source code.

9. The method of claim 8 further comprising:
identifying, for each of at least one dependency pair of said changed source code not having a corresponding dependency pair in said baseline source code, when at least one source code segment of said at least one dependency pair is not included in said baseline source code;
generating said at least one of a system interrupt, an error message and a notification, according to said identifying.

10. The method of claim 9,
wherein said notification is a first notification, when said at least one source code segment of said at least one dependency pair is not included in said baseline source code;
wherein said notification is a second notification, when a first and a second source code segments of said at least one dependency pair are included in said baseline source code; and
wherein said second notification is different than said first notification.

11. A system for improving functionality and performance of a client terminal by verifying correctness of application configuration of an application, the system comprising:
an input interface which receives baseline and changed source codes of an application for a client terminal, each when executed performs a plurality of application functionalities;
a non-transitory storage medium for storing said received baseline and changed source codes and a program code; and
a processor for executing said program code, wherein said processor is programmed to receive from said non-transitory storage medium said baseline and said changed source codes,
for each of said baseline and changed source codes to generate a graph representation of an execution flow of a plurality of application functionalities performed by execution of a respective said source code,
to analyze each of said graph representations,
to identify, by said analysis, a plurality of baseline functional dependencies between source code segments of said baseline source code, each of said baseline functional dependencies defines a dependency between one of said baseline source code segments and another one of said baseline source code segments,
to identify, by said analysis, a plurality of functional dependencies between source code segments of said changed source code, each of said functional dependencies defines a dependency between one of said changed source code segments and another one of said changed source code segments,
to define a plurality of baseline dependency pairs, each defined for another one of said plurality of identified baseline functional dependencies, wherein each of said plurality of baseline dependency pairs comprises two code segments of said baseline source code, wherein a second of said two code segments depends on a first of said two code segments,
to define a plurality of changed source code dependency pairs, each defined for another one of said plurality of identified changed source code functional dependencies, wherein each of said plurality of changed source code dependency pairs comprises two code segments of said changed source code, wherein a second of said two segments depends on a first of said two code segments, wherein each of said plurality of functional dependencies and said plurality of baseline functional dependencies is at least one of a data dependency and control dependency,
to compare functional dependencies of the baseline dependency pairs with the changed source code dependency pairs and identify one or more matches when a baseline dependency pair has a corresponding charmed source code dependency pair in the baseline source code;
to identify a configuration discrepancy according to the comparison when a dependency pair does not have a corresponding dependency pair match or identifying one or more dependency pairs in the changed source code which are not permitted by the application configuration;

to generate at least one of a system interrupt or an error message as a notification, when said configuration discrepancy is identified.

12. The system of claim 11, wherein said plurality of application functionalities each includes at least one member of a group consisting of application logics, user interface (UI), screens and screen controls.

13. The system of claim 11, wherein at least one of said graph representations includes at least one member of a group consisting of a control flow graph and a data flow graph.

14. The system of claim 11, wherein said application is a mobile application.

15. The system of claim 11, wherein at least one of said graph representations includes at least one state machine.

16. The system of claim 11, wherein at least one of said graph representations includes at least one member of a group consisting of symbolic representation and an abstract syntax tree.

\* \* \* \* \*